(12) United States Patent
Johnson (10) Patent No.: US 8,622,267 B2
(45) Date of Patent: Jan. 7, 2014

(54) VEHICLE RECEIVER HITCH SUPPORTED LOCKABLE SPORTING EQUIPMENT CARRIER

(76) Inventor: Neil Douglas Johnson, Spokane, WA (US)

( * ) Notice: Subject to any disclaimer, the term of this patent is extended or adjusted under 35 U.S.C. 154(b) by 199 days.

(21) Appl. No.: 13/374,767

(22) Filed: Jan. 11, 2012

(65) Prior Publication Data

US 2012/0175395 A1    Jul. 12, 2012

Related U.S. Application Data (60) Provisional application No. 61/461,042, filed on Jan. 12, 2011.

(51) Int. Cl.
*B60R 9/10*    (2006.01)
(52) U.S. Cl.
USPC ............ 224/519; 224/532; 224/535; 224/924
(58) Field of Classification Search
USPC .................................. 224/519, 532, 535, 924
See application file for complete search history.

(56) References Cited

U.S. PATENT DOCUMENTS

| | | | | |
|---|---|---|---|---|
| 3,877,622 A * | 4/1975 | McLain | .......... | 224/497 |
| 3,917,138 A * | 11/1975 | Bergeron | ...................... | 224/535 |
| 4,143,799 A * | 3/1979 | Dietlein et al. | ............... | 224/536 |
| 4,171,077 A * | 10/1979 | Richard, Jr. | .................... | 224/500 |
| 4,298,151 A * | 11/1981 | O'Connor | ...................... | 224/329 |
| 4,676,413 A * | 6/1987 | Began et al. | ..................... | 224/532 |
| 4,676,414 A * | 6/1987 | Deguevara | ..................... | 224/535 |
| 5,004,133 A * | 4/1991 | Wyers | ............................ | 224/519 |
| 5,007,567 A * | 4/1991 | Foster | ......................... | 224/42.13 |
| 5,050,785 A * | 9/1991 | Hays | ............................. | 224/511 |
| 5,190,195 A * | 3/1993 | Fullhart et al. | ................. | 224/497 |
| 5,372,287 A * | 12/1994 | Deguevara | ..................... | 224/510 |
| 5,469,997 A * | 11/1995 | Carlson | .......................... | 224/521 |
| 5,529,231 A * | 6/1996 | Burgess | ......................... | 224/502 |
| 5,638,706 A * | 6/1997 | Stevens | ............................. | 70/19 |
| 5,641,108 A * | 6/1997 | Ewer | .............................. | 224/536 |
| 5,662,256 A * | 9/1997 | Bryan | ............................ | 224/523 |
| 5,664,717 A * | 9/1997 | Joder | ............................. | 224/502 |
| 6,164,508 A * | 12/2000 | van Veenen | .................... | 224/509 |
| 6,394,327 B1 * | 5/2002 | Mietlicki | ......................... | 224/547 |
| 6,783,041 B2 * | 8/2004 | Ford et al. | ...................... | 224/536 |
| 7,097,408 B2 * | 8/2006 | Paxton | ............................ | 414/462 |

* cited by examiner

*Primary Examiner* — Justin Larson
(74) *Attorney, Agent, or Firm* — William A. Jeckle (57) ABSTRACT

A vehicle receiver hitch supported lockable sporting equipment carrier provides a receiver hitch beam, structurally carrying an upwardly extending vertical beam. A horizontal support beam is structurally carried by the vertical beam, at an end portion opposite the receiver hitch beam. The horizontal support beam defines an axial channel extending therethrough for releasable engagement with a locking bar. The locking bar has one leg that releasably engages with the axial channel defined in the horizontal support beam, and a second leg that releasably engages with a hole defined in the vertical beam, spacedly adjacent the horizontal support beam. A lock hasp hole defined in an end portion of the locking bar provides for engagement of a lock.

13 Claims, 7 Drawing Sheets

VEHICLE RECEIVER HITCH SUPPORTED LOCKABLE SPORTING EQUIPMENT CARRIER

RELATED APPLICATIONS

This application claims the benefit of earlier filed U.S. Provisional Patent Application No. 61/461,042, filed on Jan. 12, 2011 and titled Vehicle Hitch Mounted Sporting Equipment Carrier and Locking System, the entire teachings of which are incorporated herein by this reference.

FIELD OF INVENTION

The present invention relates generally to sporting equipment racks used for carrying items, such as bicycles, on a vehicle. More particularly, the invention relates to a vehicle receiver hitch supported sporting equipment carrier having an integrated locking system to prevent theft of the sporting equipment carried on the carrier.

BACKGROUND AND DESCRIPTION OF PRIOR ART

Bicycling has become a popular activity and enthusiasts engaging in the sport range from experts and professionals who make their livelihoods racing and riding bicycles, to children who simply enjoy the freedom bicycles provide. As would be expected, as the popularity of bicycling has increased, advancements in technology and equipment have followed, and consequently bicycles may have substantial values ranging into the thousands of dollars for professional racing type bicycles.

Unfortunately, as the value of such bicycles has increased, so has the likelihood of theft of such bicycles, which can lead to significant economic loss, insurance claims, damage to professional livelihoods, and even emotional trauma.

Vehicle mounted bicycle carrying racks are known, and are available, in a variety of configurations. Known bicycle carrying racks generally support bicycles in an upright position and engage with the bicycle wheels and/or frame in a variety of ways. Such racks may carry the front and/or rear wheel of the bicycle in a tray, and have an adjustable pivoting arm that also engages with the bicycle frame. Other known racks support the bicycle in an open-top "saddle" that releasably engages a portion of the bicycle frame so that the bicycle is suspended therefrom. Most bicycle carrying racks further have at least one, and preferably several straps that are used to positionally secure the bicycle to the rack.

The feature that it is lacking from known bicycle carrying racks is an integrated locking system that prevents bicycles carried on the rack from being stolen.

In the past, users have attempted to secure bicycles to known bicycle carrying racks using chains, cables or the like that are looped through the bicycle frame, and/or wheels, and around the carrying rack. Unfortunately, such locking cables, chains and the like are necessarily lightweight and must be flexible to be "threaded" through the various orifices and openings of the bicycle frame and wheels for securement. Correspondingly, because the cables and/or chains are lightweight and flexible, they are also typically relatively easy to cut or otherwise break by a thief who might have access to a bolt cutter, hacksaw, or the like. Known cables, chains and the like can be quickly and rapidly broken/cut by experienced thieves, and before a bicycle owner is aware, the expensive bicycle may be gone and forever lost. This is particularly problematic when a bicycle owner is traveling and needs to stop even briefly, such as to eat, during which time the vehicle carrying the bicycle may be left unattended and out of sight.

Prior efforts to develop locking mechanisms that secure bicycles to bicycle carriers have been made, but such locking mechanisms continue to have drawbacks such as, but not limited to, requiring modification of the bicycle, requiring specific placement of the bicycle on the rack, they are cumbersome, they are expensive, they are difficult to store, they are difficult to operate and they are expensive to manufacture.

What is needed is a locking assembly that is integrated into a bicycle carrying rack that is easy to operate, is difficult for unauthorized people to remove, is easily storable, is easily operable, does not require modification of the bicycle, does not require special attachments, and is suitable for use with nearly any size and configuration of bicycle that might be desired to be carried upon the bicycle rack.

My invention overcomes various of the aforementioned drawbacks and resolves various of the aforementioned needs by providing a vehicle receiver hitch supported lockable sporting equipment carrier having an integrated locking assembly for prevention of theft of bicycles carried on the rack. My invention is easy to operate, and does not require modification of the bicycle, or any attachments to a bicycle frame. My invention is easily storable within the bicycle rack, and cannot be easily or quickly cut or broken for unauthorized removal of bicycles carried on the rack.

My invention does not reside in any one of the identified features individually but rather in the synergistic combination of all of its structures, which give rise to the functions necessarily flowing therefrom as hereinafter specified and claimed.

Some or all of the drawbacks and problems explained above, and other drawbacks and problems, may be helped or solved by the invention shown and described herein. My invention may also be used to address other drawbacks and problems not set out herein or which become apparent at a later time. The future may also bring to light unknown benefits which may be in the future appreciated from the novel invention shown and described herein.

SUMMARY

A vehicle receiver hitch supported lockable sporting equipment carrier provides a receiver hitch beam, structurally carrying an upwardly extending vertical beam. A horizontal support beam is structurally carried by the vertical beam, at an end portion opposite the receiver hitch beam. The horizontal support beam defines an axial channel extending therethrough for releasable engagement with a locking bar. The locking bar has one leg that releasably engages with the axial channel defined in the horizontal support beam, and a second leg that releasably engages with a hole defined in the vertical beam, spacedly adjacent the horizontal support beam. A lock hasp hole defined in an end portion of the locking bar provides for engagement of a lock.

In providing such vehicle receiver hitch supported lockable sporting equipment carrier it is:
a principal object is to provide a bicycle carrying rack having an integrated locking means.
a further object to provide such a carrier that is releasably attachable to a vehicle receiver hitch.
a further object to provide such a carrier that deters theft.
a further object to provide a carrier that is easy to use, compact, and capable of carrying bicycles of all shapes and sizes.
a further object to provide such a carrier which includes an integrated locking mechanism that does not require a bicycle to be disassembled to be locked into place.

a further object to provide such a carrier that does not require modification of the bicycle.

a further object to provide such a carrier that does not require installation of any apparatus on the bicycle.

a further object to provide such a carrier that provides a means for storing the locking mechanism when not in use.

a still further object to provide such a carrier that is of new and novel design, of rugged and durable nature, of simple and economic manufacture and one that is otherwise well-suited to the uses and purposes for which it is intended.

Other and further objects of my invention will appear from the following specification and accompanying drawings which form a part hereof. In carrying out the objects of my invention, it is to be understood that its structures and features are susceptible to change in design and arrangement with only one preferred and practical embodiment of the best known mode being illustrated in the accompanying drawings and specified as is required.

BRIEF DESCRIPTIONS OF THE DRAWINGS

Specific forms, configurations, embodiments and/or diagrams relating to and helping to describe preferred versions of my invention are explained and characterized herein, often with reference to the accompanying drawings. The drawings and all features shown therein also serve as part of the disclosure of my invention of the current application whether described in the text or by graphical disclosure. Such drawings are briefly described below.

DESCRIPTION OF PREFERRED EMBODIMENT

Introductory Notes

The readers of this document should understand that the embodiments described herein may rely on terminology used in any section of this document and other terms readily apparent from the drawings and figures and the language common therefore as may be known in a particular art and such as known or indicated and provided by dictionaries. Dictionaries were used in the preparation of this document. Widely known and used in the preparation hereof are *Webster's Third New International Dictionary* (© 1993), *The Oxford English Dictionary* (Second Edition, ©1989), *The New Century Dictionary* (©2001-2005) and the *American Heritage Dictionary of the English Language* (4th Edition©2000) all of which are hereby incorporated by reference for interpretation of terms used herein, and for application and use of words defined in such references to more adequately or aptly describe various features, aspects and concepts shown or otherwise described herein using more appropriate words having meanings applicable to such features, aspects and concepts.

This document is premised upon using one or more terms or features shown in one embodiment that may also apply to or be combined with other embodiments for similar structures, functions, features and aspects of the invention and provide additional embodiments of the invention. Wording used in the claims is also descriptive of the invention and the text of both claims and abstract are incorporated by reference into the description entirely. Terminology used with one, some or all embodiments may be used for describing and defining the technology and exclusive rights associated herewith.

Overview of the Apparatus

As used herein, the term "forward", its derivatives, and grammatical equivalents refers to that portion of my carrier that is positioned proximate an operator cab of a vehicle having a receiver hitch for supporting the carrier. The term "rearward", its derivatives, and grammatical equivalents refers to that portion of my carrier that is positioned distal from the operator cab. The term "outer", its derivatives, and grammatical equivalents refers to a driver-side portion or passenger-side portion of a vehicle as opposed to the laterally medial portion of a vehicle.

My vehicle receiver hitch supported lockable sporting equipment carrier 9 generally provides a receiver hitch beam 10, a vertical beam 20, a horizontal support beam 30 releasably carrying at least one equipment support 50, and a locking bar 40 that releasably engages with the vertical beam 20 and horizontal support beam 30.

The receiver hitch beam 10 is elongate and has a first end portion 11 and an opposing second end portion 12. A locking pin hole 13 is defined in the receiver hitch beam 10 proximate the first end portion 11 for releasable engagement of a locking pin 64 to extend therethrough and secure the receiver hitch beam 10 to a receiver hitch 61 of a vehicle (not shown). If the receiver hitch beam 10 is not formed of a solid bar, an axial channel 14 is defined by the receiver hitch beam 10 extending from the first end portion 11 to the second end portion 12.

The vertical beam 20 preferably has a peripheral configuration similar to that of the receiver hitch beam 10, but may also include other forms such as round, oval and other shapes that are strong as well as aesthetically appealing. The vertical beam 20 has a first lower end portion 21 and an opposing second upper end portion 22 with a medial channel (not shown) extending from the first end portion 21 to the second end portion 22. The first lower end 21 of the vertical beam 20 is structurally interconnected with the second end 12 of the receiver hitch beam 10 such as by welding so that the vertical beam 20 extends generally perpendicularly relative to the receiver hitch beam 10. It is contemplated however that the receiver hitch beam 10 and the vertical beam 20 may also be cast or molded, or otherwise formed as a unitary piece without the need for a seam or joint to interconnect the adjacent end portions thereof.

Support beam hole 24 is defined in the vertical beam 20 spacedly adjacent the second upper end 22, forming a channel (not shown) extending through the vertical beam 20 from a front side 20a to a rear side 20b. A locking bar hole 25 is defined in the vertical beam 20 spacedly adjacent above the support beam hole 24 more proximate the second upper end 22. Similar to the support beam hole 24, the locking bar hole 25 defines a channel (not shown) extending through the vertical beam 20 from a front side 20a to a rear side 20b. Bushing 26 is carried in the channel (not shown) defined by the locking bar hole 25 to provide secure engagement with the locking bar 40 and to reduce metal on metal contact that might cause excessive wear and noise. End cap 27 is carried at the second end 22 of the vertical beam 20 to prevent water, debris and the like from entering the channel (not shown), and also to provide a more aesthetically appealing appearance.

The horizontal support beam 30 is elongate, has a first end portion 31 and an opposing second end portion 32 and defines in axial channel 34 communicating between the first end portion 31 and the second end portion 32. The horizontal support beam 30 is structurally interconnected with the vertical beam 20 and extends through the channel (not shown) defined by the support beam hole 24 and is structurally secured in place, such as by welding about all immediately adjacent surfaces on both the front side 20a and the rear side 20b of the vertical beam 20. The horizontal support beam 30 extends parallel to the receiver hitch beam 10 in a direction opposite the receiver hitch beam 10 such that the carrier 9, when viewed from a orthographic side view has a squared "Z" shape. The axial channel 34 defined by the horizontal support beam 30 has a first orifice 35 defining an opening to the axial channel 34 on the front side 20a of the vertical beam 20, and a second orifice 36 defining an opening to the axial channel 34 at the second end portion 32 of the horizontal support beam 30 on the rear side 20b of the vertical beam 20. In the preferred embodiment, the horizontal support beam 30 is formed of stainless steel because of stainless steel's strength, resistance to cutting, durability and resistance to rust, corrosion and the like. It is anticipated however that other materials such as, but not limited to, steel, alloys and composites may likewise be used for the horizontal support beam 30. Further the horizontal support beam 30 is preferably "pipe like" or cylindrical in configuration having an outer circumferential surface 33 for adjustably carrying the at least one equipment support 50.

Figure 7:
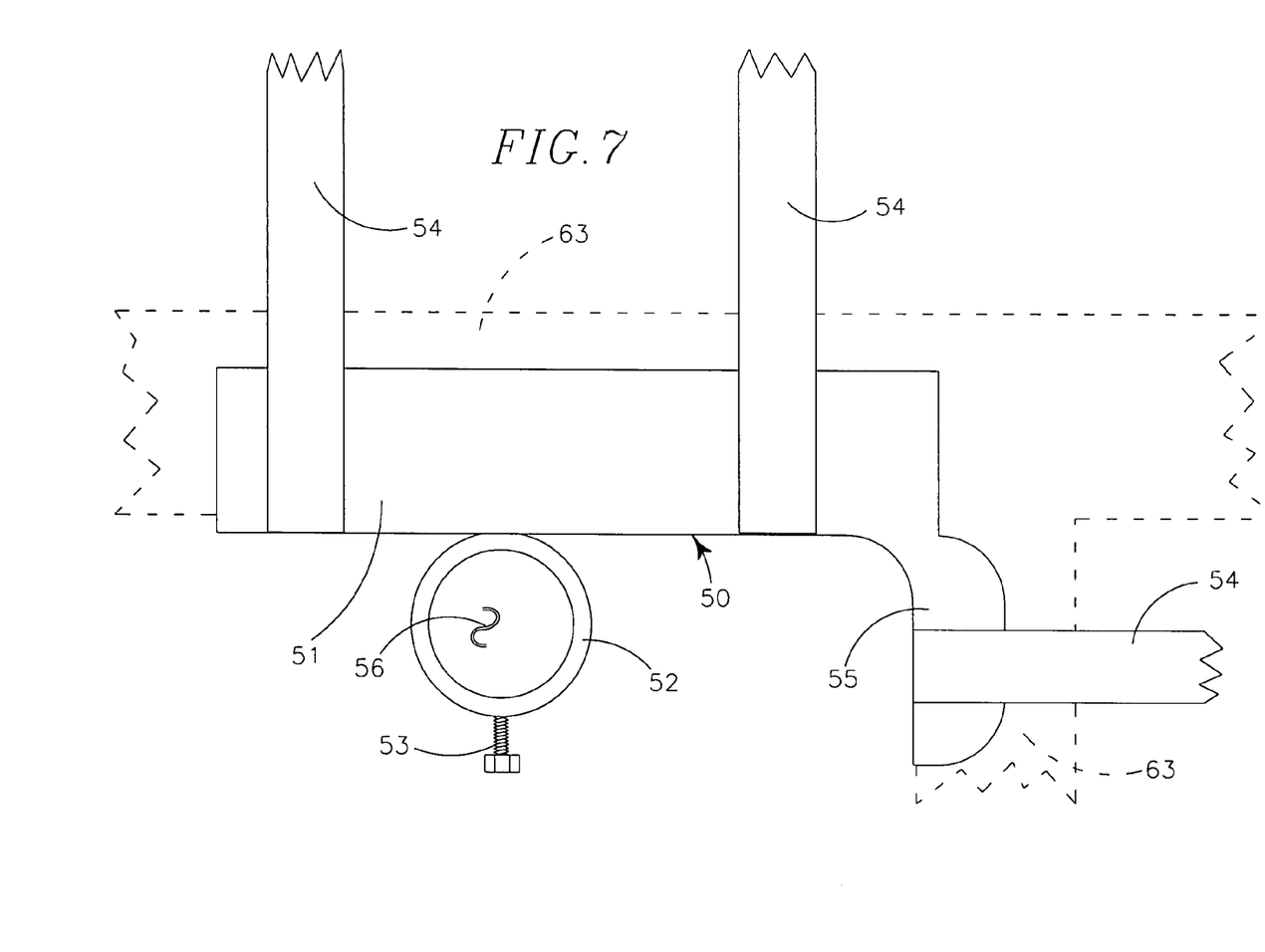
FIG. 7 is an orthographic side view of a preferred embodiment of an equipment support showing the base tray, the mounting beam sleeve, the angular leg and plural securing straps with a bicycle frame, shown in dashed outline, carried within the base tray.

The at least one equipment support 50 may have a variety of configurations, but in the preferred embodiment (FIG. 7) includes an elongated base tray 51 that defines an open top "trough" such that a portion of a frame 63 of a bicycle may be carried within the trough which may be orthographical or concave in configuration. A mounting beam sleeve 52 is structurally interconnected to a bottom portion of the base tray 51 and provides a means for attaching the at least one equipment support 50 to the horizontal support beam 30. In the preferred embodiment, the mounting beam sleeve 52 is "pipe-like" such that the horizontal support beam 30 may pass through a medial channel 56 defined by the mounting beam sleeve 52 so that the mounting beam sleeve 52 frictionally communicates with the outer circumferential surface 33 of the horizontal support beam 30. Known securing means 53, such as, but not limited to, threaded bolts may be carried in radially aligned threaded holes (not shown) defined in the mounting beam sleeve 52 to frictionally engage with the outer circumferential surface 33 of the horizontal support beam 30 to positionally secure the at least one equipment support 52 on the horizontal support beam 30 and to prevent undesirable movement of the at least one equipment support 50 relative to the horizontal support beam 30.

Known releasable adjustable securing straps 54, such as elongate pieces of "hook and loop" fastener, "bungee cords" and the like are fastened to the at least equipment support 50 to positionally secure the bicycle frame 63 to the at least one equipment support 50. In a particularly preferred embodiment, each base tray 51 of each at least one equipment support 50 includes an angularly depending leg 55 at one end portion of the base tray 51. The angular leg 55 is configured to frictionally communicate with a vertical element of the bicycle frame 63 and be secured thereto with a securing strap 54 so that the bicycle frame 63 does not slidably move within the base tray 51 and does not axially rotate within the base tray 51 responsive to movement and vibration of the vehicle during use of the vehicle.

The locking bar 40 has a somewhat horizontal "J" configuration having a longer first leg 43, a shorter second leg 44 and an offsetting leg 45 joining the first leg 43 and the second leg 44 at proximate end portions thereof so that the second leg 44 extends parallel to the first leg 43 and in the same direction. The offsetting leg 45 need not be straight but may be curvilinear. The first leg 43, the offsetting leg 45 and the second leg 44 are structurally interconnected at adjacent end portions, such as by welding. In an alternative embodiment, the locking bar 40 may be bent, or otherwise formed from a unitary piece of material to form the first leg 43, the offsetting leg 45 and the second leg 44. A lock hasp hole 46 is defined in the first leg 43 proximate first end portion 41 opposite the offsetting leg 45 to provide for releasable engagement with a lock (not shown).

As shown in Figures, engagement of the locking bar 40 with the horizontal support beam 30 and the vertical beam 20 creates "cage" about the at least one equipment support 50 and any bicycles (not shown) carried therein. The first end portion 41 of the first leg 43, opposite the offsetting leg 45 passes through the locking bar hole 25 defined in the vertical beam 20 and the bushing 26 carried therein, while simultaneously, the second end portion 42 of the second leg 44, opposite the offsetting leg 45 passes into the second orifice 36 and engages with the axial channel 34 defined in the horizontal support beam 30. After the first and second legs 43 and 44 respectively of the locking bar 40 are engaged with the locking bar hole 25 and the axial channel 34 of the horizontal support beam 30 and the first end portion 41 of the first leg 43 has passed completely through the locking bar hole 25 defined in the vertical beam 20 and extends outwardly from the first side 20a of the vertical beam 20, a known lock (not shown) preferably a "shoulder-type lock" having an approximately ¾" opening between its shoulder portions, a commercially available example of which is identified as a TMC 10FL TRIMAX Deluxe Key Coupler Lock manufactured by TRI-MAX™ Corporation of Englewood Colo., USA (similar "shoulder-type locks" are available from other lock manufacturers as well) is engaged with the also available by other companies lock hasp hole 46 defined in the first leg 43 of the locking bar 40 on a front side 20a of the vertical beam 20. Engagement of the lock (not shown) with the lock hasp hole 46 prevents the locking bar 40 from being axially withdrawn from the locking bar hole 25. The inability to axially withdraw the locking bar 40 from the locking bar hole 25 defined in the vertical beam 20 maintains engagement of the second leg 44 with the axial channel 34 defined in the horizontal support beam 30. The inability to remove, or otherwise axially twist the locking bar 40 maintains the "cage" surrounding and engaging the bicycle frame 63 carried on the carrier 9. Only by removing the lock (not shown) engaged with the lock hasp hole 46 may the locking bar 40 be withdrawn and the bicycles (not shown) be removed from the carrier 9.

The identified shoulder-type coupler lock is preferred because it has a structural configuration that tightly engages with the locking bar 40 and lock hasp hole 46, and does not allow easy access to the lock hasp by a bolt cutter, or other device that might be used to cut the lock from the carrier.

Other coupler locks may likewise be used, but I have found the aforementioned TRIMAX shoulder-type coupler lock to be preferred.

Figure 1:
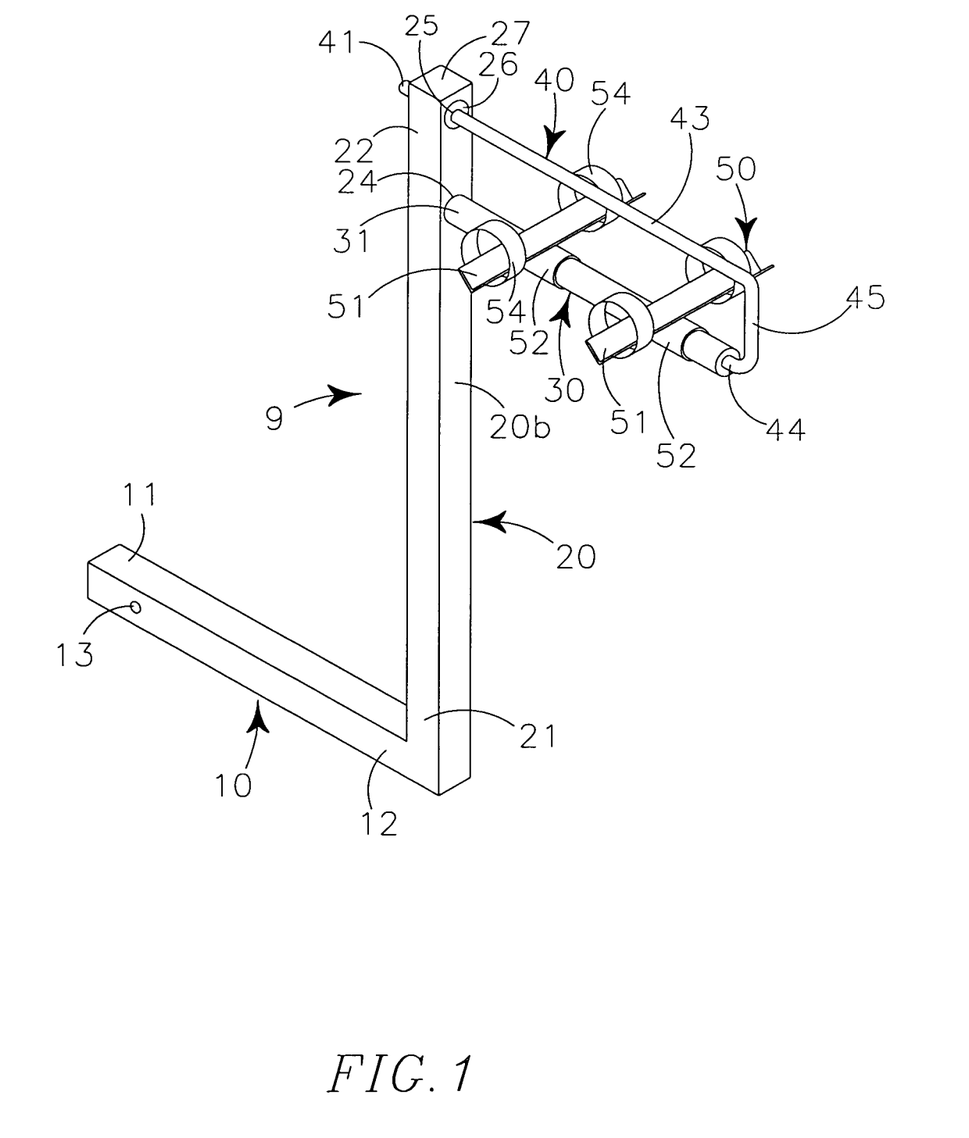
FIG. 1 is an isometric first side, top and back view of my vehicle receiver hitch supported lockable sporting equipment carrier showing the locking bar engaged with the horizontal support beam and with the vertical beam.
Figure 2:
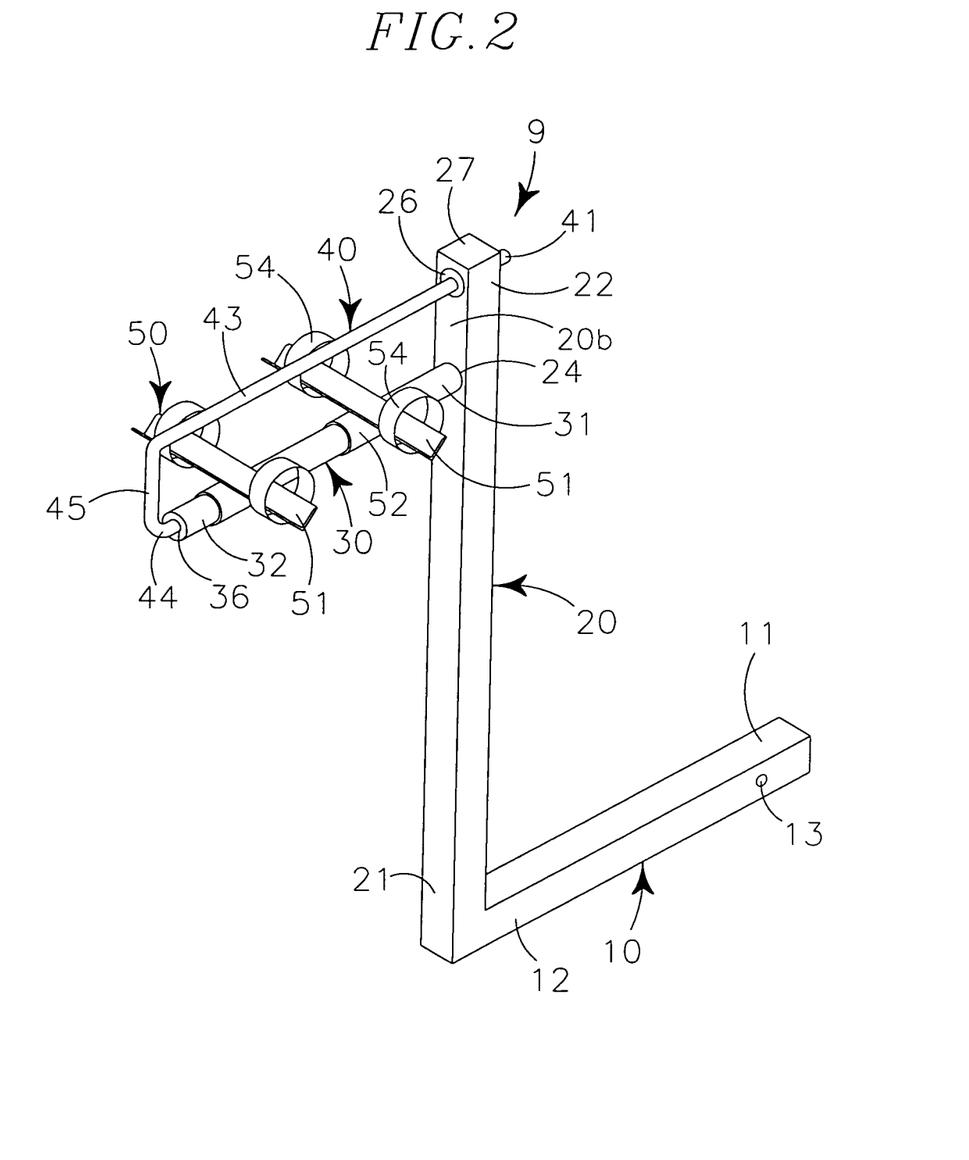
FIG. 2 is an isometric second side, top and the back view thereof.
Figure 3:
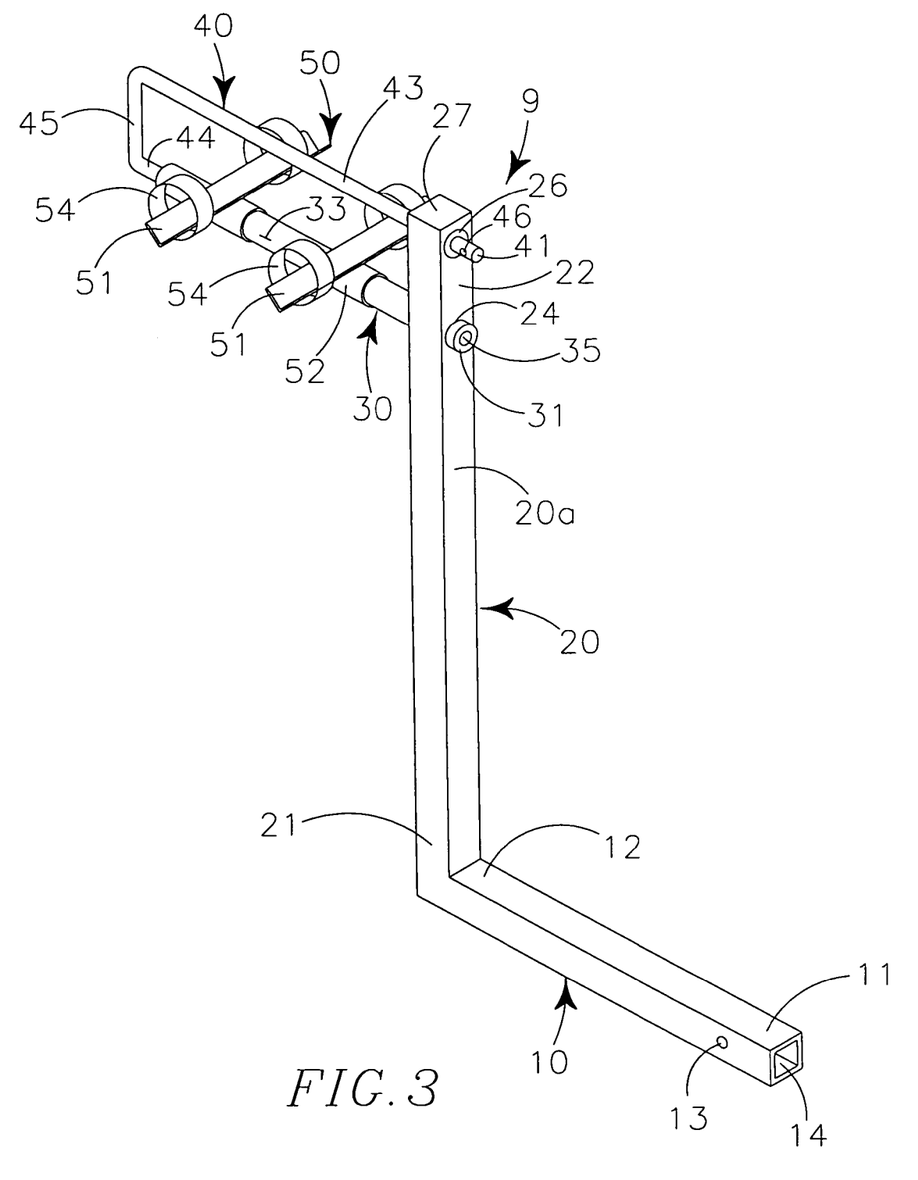
FIG. 3 is an isometric second side, top and front view thereof.
Figure 4:
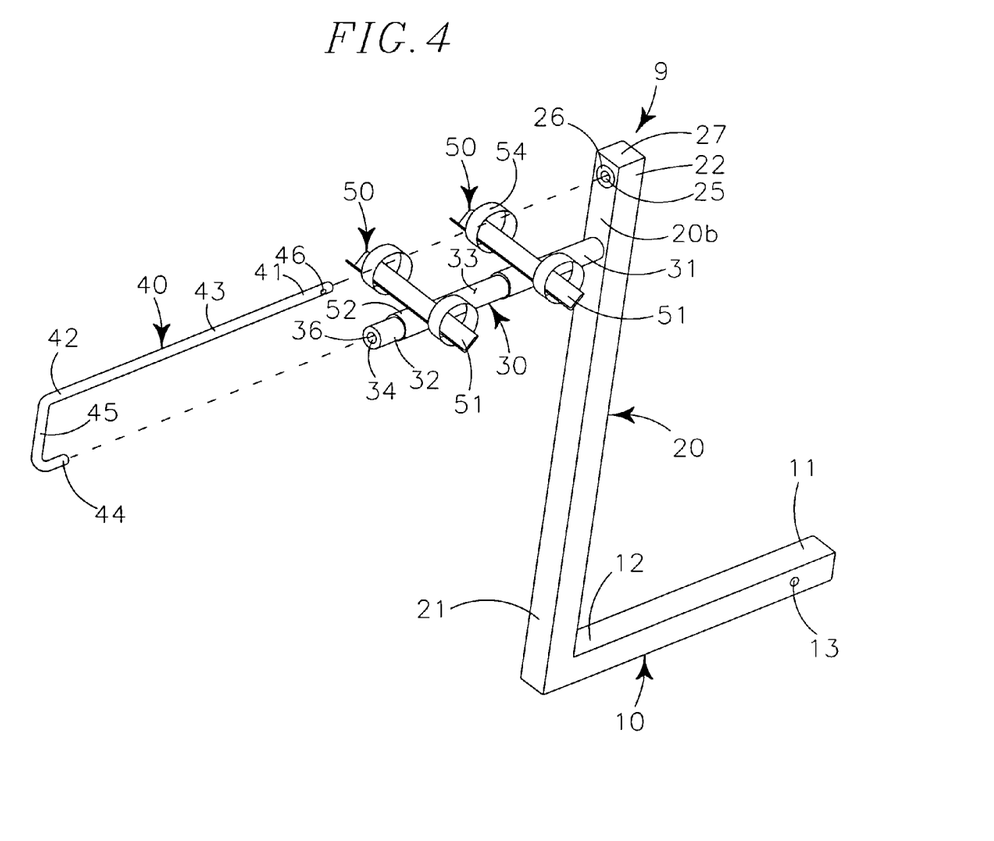
FIG. 4 is an isometric view, similar to that of FIG. 2, showing how the locking bar engages with the vertical beam and the horizontal support beam.
Figure 5:
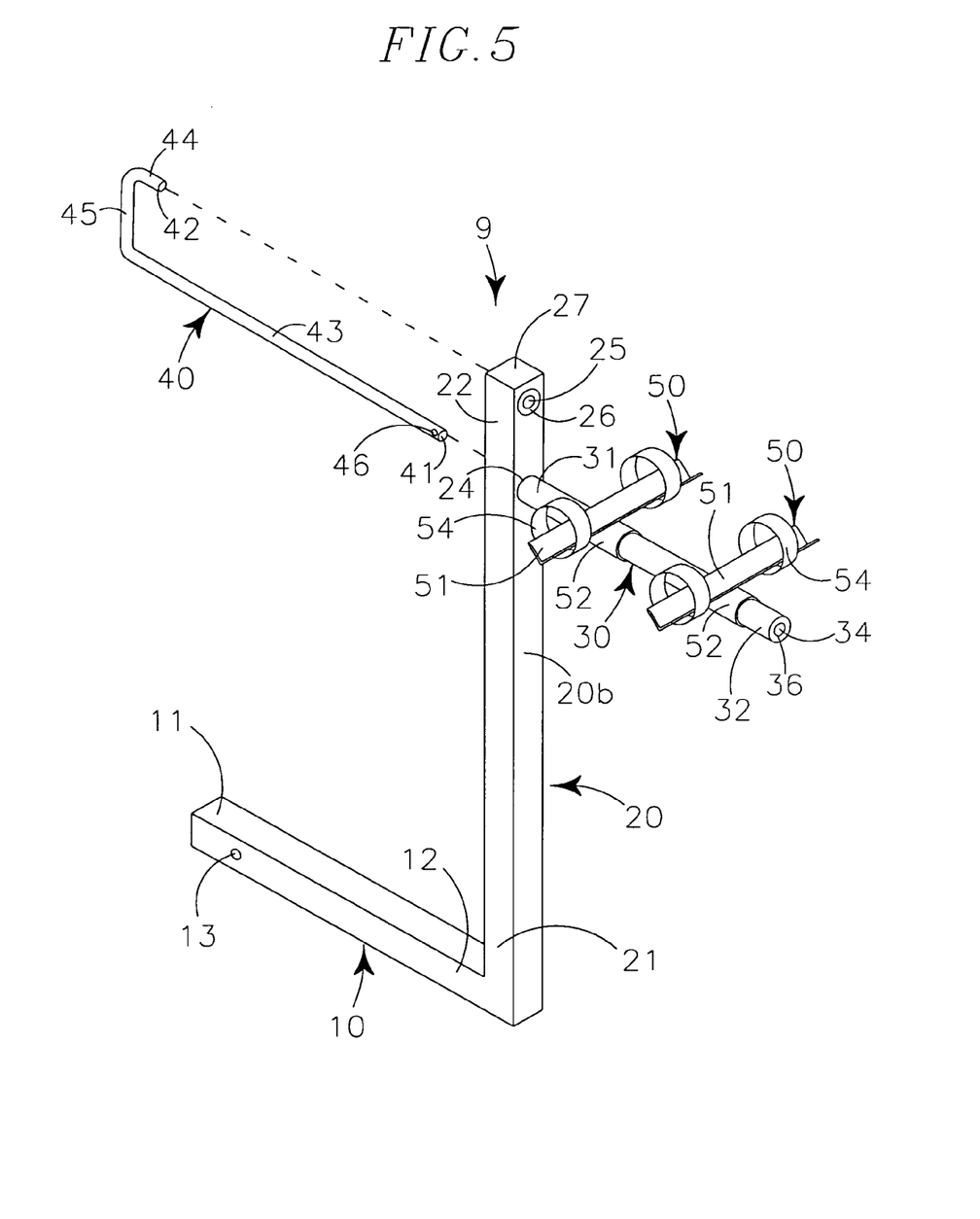
FIG. 5 is an isometric view, similar to that of FIG. 1 showing how the locking bar may be stored when not in use.
Figure 6:
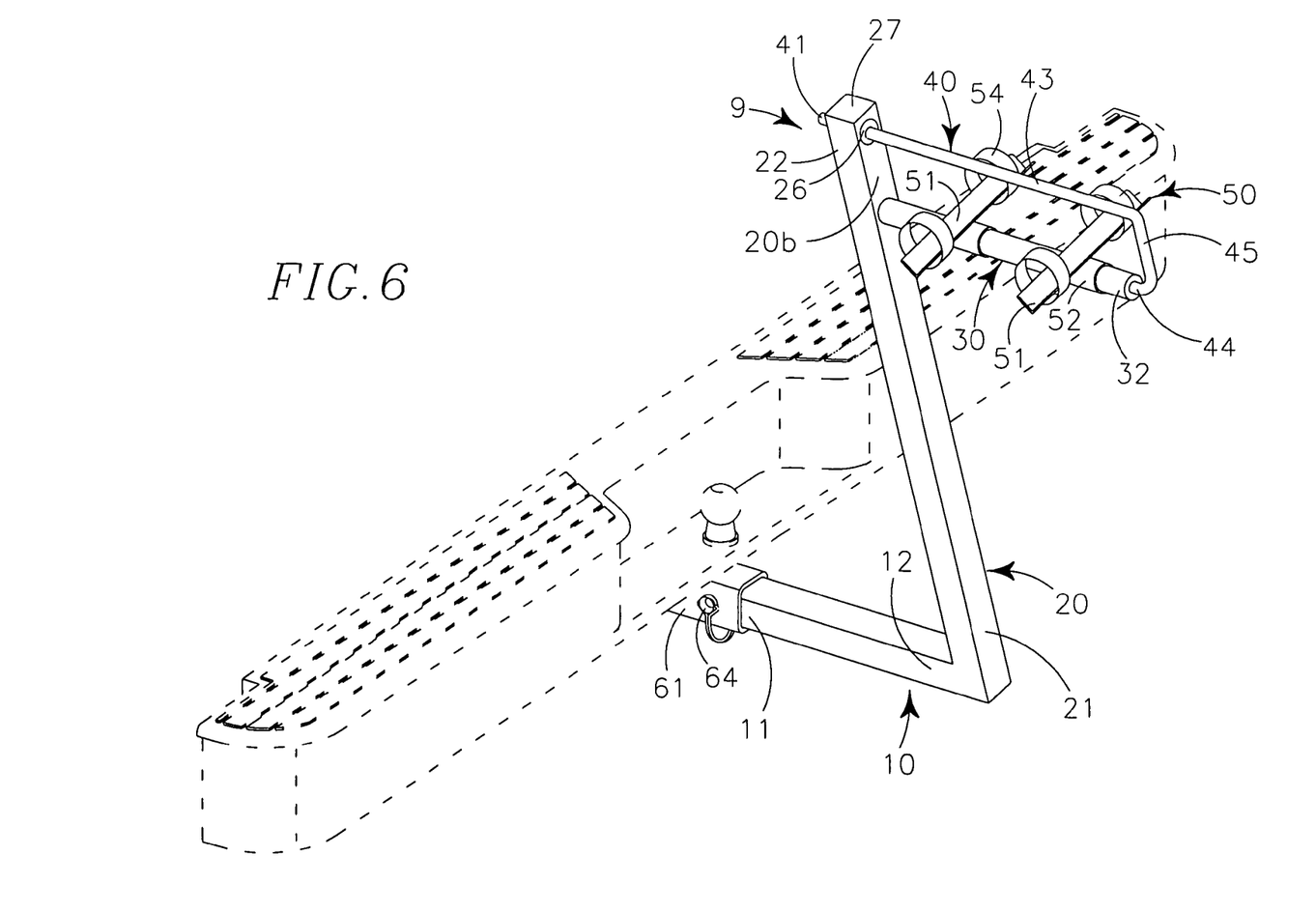
FIG. 6 is an isometric view, similar to that of FIG. 1, showing the carrier is supported by a vehicle receiver hitch below a vehicle bumper shown in dashed outline.

As shown in FIG. 5, the locking bar 40 may be stored within the axial channel 34 of the horizontal support beam 30 by inserting the first end portion 41 of the first leg 43 of the locking bar 40, into the first opening orifice 35 of the axial channel 34 from a front side 20a of the vertical beam 20, opposite the horizontal support beam 30, and simultaneously passing the second end portion 42 of the second leg 44 into and through the locking bar hole 25 on the front side 20a of the vertical beam 20 and thereafter securing a lock (not shown) in the lock hasp hole 46 defined in the first leg 43. Such secure storage of the locking bar 40 will prevent theft of the locking bar 40 and also prevents any rattling and otherwise disturbing noises that may be generated by the locking bar 40 when bicycles are not stored on the carrier 9 and the vehicle (not shown) is operated.

Construction and Materials of the Apparatus

The receiver hitch beam 10 and the vertical beam 20 are preferably formed of steel box beams of strong rigid material such as, but not limited to, steel, stainless steel, aluminum, aluminum alloys, composites, and the like. Although the receiver hitch beam 10 is necessarily of a box beam configuration to engage with the receiver hitch 61, the vertical beam 20 need not have a box beam configuration and it is anticipated that other configurations, such as round, oval, and orthogonal shapes may also be employed.

The locking bar 40 is preferably formed from hardened steel, stainless steel or other metal alloys that are difficult to cut. Preferably the locking bar 40 is formed from solid bar stock.

The horizontal support beam 30 is preferably formed of stainless steel because of the material's strength, durability, hardness, resistance to cutting and bending and resistance to corrosion such as rust and the like.

Having described the structure of my vehicle receiver hitch supported lockable sporting equipment carrier, its operation may be understood.

The carrier 9 is oriented so that the first end portion 11 of the receiver hitch beam 10 may be axially inserted into a channel (not shown) defined by a receiver hitch 61 carried by a vehicle (not shown). The first end portion 11 of the receiver hitch beam 10 is thereupon axially inserted into the receiver hitch channel (not shown). The locking pin hole 13 is aligned with locking pin holes (not shown) defined in the receiver hitch 61 and a locking pin 64 is inserted therethrough to positionally secure the carrier 9 relative to the receiver hitch 61 and vehicle (not shown). If desired, the locking pin 64 may be lockable to prevent unauthorized removal.

The locking bar 40 is removed from engagement with the locking bar hole 25 defined in the vertical beam 20 and from the axial channel 34 defined by the horizontal support beam 30 by axially withdrawing the locking bar 40, relative to the horizontal support beam 30.

At least one equipment support 50 is positioned on the horizontal support beam 30, by passing the mounting beam sleeve 52 of the equipment support 50 over and about the circumferential surface 33 of the horizontal support beam 30. Friction fittings 53 are tightened to positionally secure the mounting beam sleeve 52 and attached base tray 51 to the horizontal support beam 30. The orientation of the equipment support 50 may be adjusted as necessary depending upon the configuration of the bicycle frame 63. Once the orientation of the base tray 51 has been determined, the friction fittings 53 should be securely tightened so that the equipment support 50 does not rotate or move relative to the horizontal support beam 30.

The securing straps 54 are loosened and a bicycle is placed within the base tray 51 so that the bicycle frame 63 rests within the trough and the bicycle depends therefrom. The bicycle frame 63 should be moved elongately relative to the base tray 51 so that the angular leg 55 of the equipment support 50 frictionally communicates with a vertically extending portion of the bicycle frame 62, such as a bicycle seat support. The securing straps 54 are thereafter secured about the bicycle frame 63 to positionally maintain the bicycle frame 63 within the base tray 51 and frictionally against the angular leg 55 to prevent any movement or rotation of the bicycle frame 63 relative to the equipment support 50.

If more than one bicycle is to be fastened to the carrier 9, the process, as noted above, is repeated for the second and any subsequent bicycle.

The locking bar 40 is installed by orienting the locking bar 40 such that the first leg 43 is horizontal relative to the ground and the first leg is positioned vertically above the second leg 44, and the offsetting leg 45 is distal from the vertical beam 20. The first end portion 41 of the first leg 43 is inserted into the locking bar hole 25. Once the first end portion 41 of the first leg 43 has entered into the locking bar hole 25 the locking bar 40 may be rotated axially about the first leg 43 to align the second leg 44 with the second orifice 36 to the axial channel 34 defined by the horizontal support beam 30. Once the second end portion 42 of the second leg 44 is axially aligned with the second orifice 36 to the axial channel 34, the locking bar 40 is moved axially toward the vertical beam 20 so that the second leg 44 of the locking beam 40 enters into and engages with the axial channel 34 defined by the horizontal support beam 30. A lock (not shown) is thereafter engaged with the lock hasp hole 46 defined in the first end portion 41 of the first leg 43 of the locking bar 40, on the front side 20a of the vertical beam 20 opposite the horizontal support beam 30 and the bicycles.

When the bicycles are to be removed from the carrier 9, the lock (not shown) engaged with the lock hasp hole 46 defined in the first end portion 41 of the first leg 43 is disengaged, such as with a key, and removed from the lock hasp hole 46. Thereafter, the locking bar 40 may be axially withdrawn from the locking bar hole 25 such that the locking bar 40 is disengaged from the carrier 9, and the bicycles may be removed.

To store the locking bar 40, such as when the carrier 9 is not in use, the locking bar 40 is oriented such that the first leg 43 and the second leg 44 are horizontal relative to the ground with the second leg 44 vertically above the first leg 43. The first end portion 41 of the first leg 43 is aligned with the first orifice 35 to the axial channel 34 on a front side 20a of the vertical beam 20, and is inserted therein. The second end portion 42 of the second leg 44 is aligned with the locking bar hole 25 on a front side 20a of the vertical beam 20, and the second leg is thereafter passed into and through the locking bar hole 25 so that the second end portion 42 of the second leg 44 passes through the vertical beam 20 and extends outwardly from a rear side 20b of the vertical beam 20 proximate the horizontal support beam 30. Thereafter, a lock (not shown) is engaged with the lock hasp hole 46 which secures the locking bar 40 in place and prevents theft or loss thereof.

Interpretation Notes

The above description has set out various features, functions, methods and other aspects of my invention. This has been done with regard to the currently preferred embodiments thereof. Time and further development may change the manner in which the various aspects are implemented. Such aspects may further be added to by the language of the claims which are incorporated by reference. The scope of protection accorded my invention, as defined by the claims, is not intended to be necessarily limited to the specific sizes, shapes, features or other aspects of the currently preferred embodiment shown and described. The claimed invention may be implemented or embodied in other forms still being within the concepts shown, described and claimed herein. Also included are equivalents of the invention which can be made without departing from the scope or concepts properly protected hereby.

The foregoing description of my invention is necessarily of a detailed nature so that a specific embodiment of a best mode may be set forth as is required, but it is to be understood that various modifications of details, sizes, and rearrangement, substitution and multiplication of the parts may be resorted to without departing from its spirit, essence or scope.

Having thusly described my invention, I hereby file this Utility patent application and pray for issuance of Utility Letters Patent:

1. A sporting equipment carrier comprising in combination:
    a carrier defining two axially aligned spaced apart holes for releasable engagement with end portions of a locking bar; and
    a locking bar having a first end portion and a spaced apart second end portion axially aligned with the first end portion, and the first end portion and the second end portion simultaneously engage with the axially aligned spaced apart holes defined in the carrier; wherein the carrier has a receiver hitch beam and a vertical beam and the vertical beam defines a locking bar hole spaced apart from and axially aligned with the receiver hitch beam.
2. The sporting equipment carrier of claim 1 wherein:
    the vertical beam extends angularly to the receiver hitch beam.
3. The sporting equipment carrier of claim 1 wherein:
    the vertical beam extends perpendicularly to the receiver hitch beam.
4. The sporting equipment carrier of claim 1 further comprising:
    a horizontal support beam having,
        a first end portion interconnected with the vertical beam spacedly adjacent the locking bar hole,
        a second end portion distal from the vertical beam, and
        a medial channel communicating between the first end portion and the second end portion, the medial channel defining a hole at each end thereof.
5. The sporting equipment carrier of claim 1 wherein:
    the locking bar is formed from solid bar stock.
6. The sporting equipment carrier of claim 1 wherein:
    the locking bar has
    a first leg;
    a second leg that is shorter in length than the first leg and parallel to the first leg; and
    an offsetting leg interconnecting proximate end portions of the first leg and the second leg.
7. The sporting equipment carrier of claim 6 further comprising:
    a lock hasp hole defined in the first leg of the locking bar opposite the offsetting leg.
8. A vehicle receiver hitch supported lockable sporting equipment carrier comprising in combination:
    a receiver hitch beam having opposing end portions and defining a locking pin hole proximate one end portion;
    a vertical beam having,
        an end portion interconnected to an end portion of the receiver hitch beam opposite the locking pin hole,
        a second end portion distal from the receiver hitch beam,
        a locking bar hole defined spacedly adjacent the second end portion that is axially aligned with the receiver hitch beam;
    a horizontal support beam having opposing end portions and defining a medial channel communicating between the opposing end portions carried by the vertical beam spacedly adjacent below the locking bar hole extending opposite the receiver hitch beam;
    a locking bar having,
        a first end portion and a second end portion, the first and second end portions configured for releasably simultaneously engageable with the locking bar hole and the medial channel defined by the horizontal support beam;
        a lock hasp hole defined in at least one end portion for releasable engagement with a lock; and
    at least one equipment support carried on the horizontal support beam.
9. The sporting equipment carrier of claim 8 wherein:
    the horizontal support beam is formed of stainless steel.
10. The sporting equipment carrier of claim 8 wherein:
    the receiver hitch beam and the vertical beam are formed from steel box beams.
11. The sporting equipment carrier of claim 8 wherein:
    the locking bar has a first leg;
    a second leg that is shorter in length than the first leg and parallel to the first leg; and
    an offsetting leg interconnecting proximate end portions of the first leg and the second leg.
12. The sporting equipment carrier of claim 11 further comprising:
    a lock hasp hole defined in the first leg of the locking bar opposite the offsetting leg.
13. The sporting equipment carrier of claim 8 wherein:
    the equipment carrier has,
        a base tray having opposing end portions, bottom and defines an upwardly opening trough to releasably engage with a portion of a bicycle frame,
        a mounting arm sleeve adjustably positionable on the horizontal support arm, and
        an angular leg carried at an end portion of the base tray extending angularly downwardly from the base tray to releasably frictionally communicate with a generally vertical member of the bicycle frame.

* * * * *